US008659655B2

(12) United States Patent
Pijl et al.

(10) Patent No.: US 8,659,655 B2
(45) Date of Patent: Feb. 25, 2014

(54) METHOD OF SELECTING AN OPTIMAL VIEWING ANGLE POSITION FOR A CAMERA

(75) Inventors: Marten Jeroen Pijl, Eindhoven (NL); Caifeng Shan, Eindhoven (NL); Lu Wang, Eindhoven (NL); Steven Leonardus Josephus Dimphina Elisabeth Van De Par, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 103 days.

(21) Appl. No.: 13/266,927

(22) PCT Filed: Apr. 14, 2010

(86) PCT No.: PCT/IB2010/051607
§ 371 (c)(1),
(2), (4) Date: Oct. 28, 2011

(87) PCT Pub. No.: WO2010/125489
PCT Pub. Date: Nov. 4, 2010

(65) Prior Publication Data
US 2012/0044348 A1 Feb. 23, 2012

(30) Foreign Application Priority Data
Apr. 29, 2009 (EP) ..................................... 09159052

(51) Int. Cl.
*H04N 13/00* (2006.01)
(52) U.S. Cl.
USPC .......................................................... 348/135
(58) Field of Classification Search
USPC ................................................. 348/135–140
See application file for complete search history.

(56) References Cited

U.S. PATENT DOCUMENTS

| 2007/0058879 | A1 | 3/2007 | Cutler et al. |
| 2007/0195174 | A1 | 8/2007 | Oren |
| 2007/0268369 | A1* | 11/2007 | Amano et al. ........... 348/207.99 |

FOREIGN PATENT DOCUMENTS

| JP | 2005311734 A | 11/2005 |
| JP | 2008061260 A | 3/2008 |

OTHER PUBLICATIONS

Chen et al: "An Occlusion Metric for Selecting Robust Camera Configurations"; Machine Vision and Applications, vol. 19, No. 4, Jul. 2008, pp. 217-222.
Olague et al: "Optimal Camera Placement to Obtain Accurate 3D Point Positions"; ICPR '98 Proceedings of the 14th International Conference on Pattern Recognition—vol. 1, IEEE Computer Society, 1998, 3 Page Document.
Bares et al: "Virtual 3D Camera Composition From Frame Constraints"; ACM Multimedia 2000, pp. 177-186.

(Continued)

*Primary Examiner* — Dave Czekaj
*Assistant Examiner* — M D Haque

(57) ABSTRACT

This invention relates to a method of selecting an optimal viewing angle position for a camera. A first quantitative score is determined for a first viewing angle position of the camera using pre-selected regions of interest as reference areas, the determining being performed in accordance to a pre-defined quantitative score rule. The angle position is adjusted from the first viewing angle position towards at least one second viewing angle position. For each at least one second viewing angle position a second quantitative score is determined in accordance to the pre-defined quantitative score rule, and finally a target viewing angle position is determined based on the determined quantitative scores.

6 Claims, 4 Drawing Sheets

(56) References Cited

OTHER PUBLICATIONS

Pickering, J.: "Intelligent Camera Planning for Computer Graphics": Thesis, University of York, Department of Computer Science, Sep. 2002, 161 Page Document, Retrieved From the Internet:http://citeseerx.1st.psu.edu/viewdoc/download?doi=10.1.1.14.5214&rep=rep1&type+pdf. Retrieved on Jul. 13, 2010.

Marchand et al: "Image-Based Virtual Camera Motion Strategies"; Proceedings, Graphics Interface, May 2000-, pp. 69-76.

Tarabanis et al: "A Survey of Sensor Planning in Computer Vision"; IEEE Transactions on Robotics and Automation, vol. 11, No. 1, Feb. 1995. pp. 86-104.

\* cited by examiner

METHOD OF SELECTING AN OPTIMAL VIEWING ANGLE POSITION FOR A CAMERA

FIELD OF THE INVENTION

The present invention relates to a method and a system for selecting an optimal viewing angle position for a camera.

BACKGROUND OF THE INVENTION

Computer vision or visual scene analysis is the scientific field of extracting information from images such as video sequences. The discipline is applied to a large number of applications, for instance for human visual activity recognition, the identification of human activities based on video data captured through one or more cameras.

A critical issue in this and many other computer vision applications is the placement of the cameras. As video sequences are projections of 3D space onto a 2D image plane by a camera, the camera setup (the position and the viewing angle) determines whether the captured video material is suitable for the computer vision task or not. For an application to function optimally, it is important that the camera is positioned in the best possible manner for that particular application, meaning that when e.g. the application is video conferencing, it is important that all speakers are visible to the other parties, but the camera position tends to be fixed in such conferencing systems. Several solutions for computer vision applications for such video conferencing exist. In US 20070058879 as an example, the solution is based on panoramic, whereas in JP 2008061260 the solution is based on fish-eye lenses. Another video conferencing system sets its camera configuration based on the detected positions of the users (JP 2005311734). These approaches are however only successful when the objects of interest do not occlude each other. They are however inadequate for many computer vision applications.

Nearly all computer vision systems face a fundamental challenge, namely how to determine an optimal camera setup. This problem becomes especially relevant when the end-users themselves have to position the camera, instead of an expert. From the point of view of the end-users, it should preferably be easy and straightforward to find the optimal camera setup such that the objects of interest do not occlude each other. One possible solution is to use additional cameras. However, there are considerable downsides of this approach, such as the additional costs relating to installing additional cameras, and the additional effort required to install them.

SUMMARY DESCRIPTION OF THE INVENTION

The object of the present invention is to provide an improved solution to find the best possible setup for with as few cameras as possible.

According to a first aspect, the present invention relates to a method of selecting an optimal viewing angle position for a camera, comprising:
  determining a first quantitative score for a first viewing angle position of the camera using pre-selected regions of interest as reference areas, the determining being performed in accordance to a pre-defined quantitative score rule,
  adjusting the angle position from the first viewing angle position towards at least one second viewing angle position,
  determining for each at least one second viewing angle position a second quantitative score in accordance to said pre-defined quantitative score rule, and
  determining a target viewing angle position based on the determined quantitative scores.

Thus, guidance for an end-user is provided which allows the end-user in a user friendly and automatic way to setup camera for computer vision systems. Also, an economical solution is provided since in case the computer vision system is e.g. a surveillance system fewer cameras may be need since each respective camera is capable of optimizing the viewing angle position.

In one embodiment, the pre-defined quantitative score rule includes determining whether there is an overlap amongst the regions of interest for the first and the at least one second viewing angle positions such that the more the overlap is between the regions of interest the lower will the quantitative score be, and the larger the distance is between the regions of interest the larger will the quantitative score be. Accordingly, a large overlap indicates clearly an unfavorable viewing angle position, and the larger the distance is for the non overlapping regions of interest the more favorable will the viewing angle position be. Thus, in scenarios where e.g. for all the viewing angle positions there is an overlap, the less the overlap is the higher will the quantitative score be. Also, in scenarios where there are several regions of interest where there is no overlap, the more the distance is between the region of interest is the higher will the quantitative score be.

In one embodiment, the step of determining the target viewing angle position includes selecting the viewing angle position that is associated to the highest quantitative score as the target viewing angle position.

In one embodiment, the method further comprises defining a threshold quantitative score, where in case none of the determined quantitative scores is above the threshold quantitative score a command is issued indicating that the camera is position unfavorable and shall be re-positioned. In that way, the end-user is informed about that no optimal viewing angle position can be established.

According to a second aspect, the present invention relates to a computer program product for instructing a processing unit to execute the above mentioned method steps when the product is run on a computer.

According to a third aspect, the present invention relates to a system for automatically selecting an optimal viewing angle position for a camera, comprising:
  a processor for determining a first quantitative score for a first viewing angle position of the camera using pre-selected regions of interest as reference areas, the determining being performed in accordance to a pre-defined quantitative score rule,
  an angle adjusting mechanism for adjusting the angle position from the first viewing angle position towards at least one second viewing angle position,
  a processor for:
  determining for each at least one second viewing angle position a second quantitative score in accordance to said pre-defined quantitative score rule, and
  determining a target viewing angle position based on the determined quantitative scores.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 shows one embodiment of a method according to the present invention of.

DESCRIPTION OF EMBODIMENTS

Figure 1:
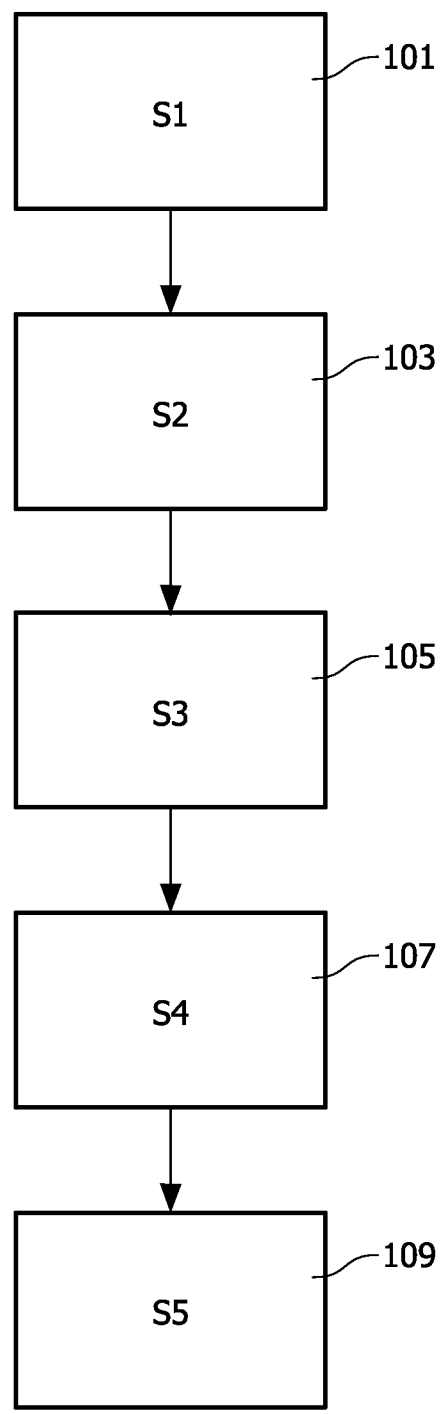

FIG. 1 shows flowchart of an embodiment of a method according to the present invention of selecting an optimal viewing angle position for a camera but the camera can as an example a security camera, a web camera, any kind of analog or digital camera.

In step (S1) 101, a first quantitative score is determined for a first viewing angle position of the camera, where pre-selected regions of interest are used as reference areas. This step of determining is performed in accordance to a pre-defined quantitative score rule. In one embodiment, this quantitative score rule is based on determining whether there is an overlap amongst the regions of interest for the first and the at least one second viewing angle positions. As an example, one region of interest could be a door frame and a second region of interest could be a table. An optimal angle position is where the door frame and the table do not overlap. Therefore, if these two regions of interest overlap the quantitative score will be lower than if these two areas do not overlap. This will be discussed in more details in conjunction with FIG. 2.

In step (S2) 103, the angle position is adjusted from the first viewing angle position towards at least one second viewing angle position, where for each new angle position said quantitative is determined (S3) 105 in accordance to said pre-defined quantitative score rule. The camera may be mounted to or be an integral part of an angle adjusting mechanism that allows one or more degrees of freedom for the angle position adjustment. As an example, when the camera is mounted to a wall the angle adjusting mechanism allows the camera adjust the horizontal and the vertical angle and even the rotation angle of the camera. Such adjustment may be done manually by an end-user, or automatically by the camera itself which may be pre-programmed to changes the angle position two or more times, where for each angle position said quantitative score is determined.

In step (S4) 107, a target viewing angle position is determined based on the determined quantitative scores. In one embodiment, the step of determining the target viewing angle position includes selecting the viewing angle position that is associated to the highest quantitative score as the target viewing angle position. Let's say the for a first angle position the score is −10, the second angle position the score is −1, and the third angle position the score is +5, the third angle position has the highest score and is selected as the target viewing angle position.

In step (S5) 109, a threshold quantitative score is defined such that in case none of the determined quantitative scores is above the threshold quantitative score a command is issued indicating that the camera is position unfavorable and shall be re-positioned. As an example, "minus" scores indicate that there is an overlap between the region of interest and "plus" scores indicate that there is no overlap. The threshold quantitative score could be the score zero, which indicates that there is no overlap between the region of interest (and no distance between the region of interest). The command that is issued could be in the form of a light signal by e.g. blinking red light or the command could be a voice command. If the camera is operated via a PC computer the computer screen could indicate to the end-user that the camera needs to be re-positioned.

Figure 2:
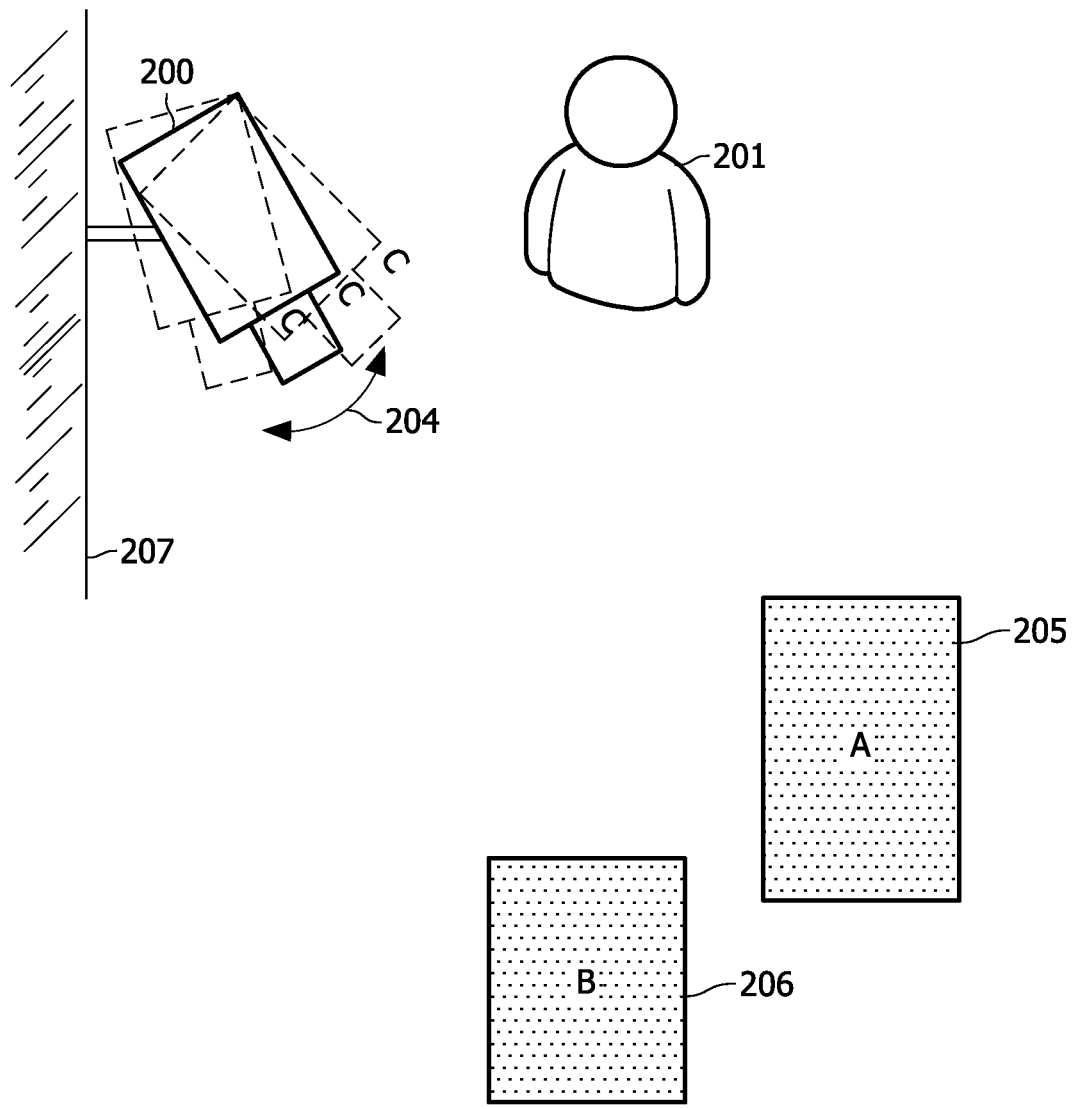
FIG. 2 depicts graphically an example where a camera has been mounted to a wall by an end-user.

FIG. 2 depicts graphically an example where a camera 200 has been mounted to a wall 207 by an end-user 201. In many computer vision systems, interest regions are defined or detected. For example, for visual activity recognition in a kitchen setting, interest regions may include the fridge, stove, sink, and so on. For interest-region based computer vision applications, it is important to set up the camera in such a manner that it has a clear view of all interest regions, and that these interest regions do not overlap (are not occluded) and clearly separated.

In this example, the end-user 201 has selected two regions of interest, area A 205 and area B 206, but the regions of interest have to be indicated at the beginning. There are different methods to indicate the regions of interest. For example, they can be explicitly indicated by the end-user 201 (in a captured image plane, or in the user space), or automatically detected by computer vision algorithms. As discussed previously, the aim is to find the most optimal camera setup such that the regions of interest 205, 206 are far away from each other and without (or with less) overlap. As discussed in FIG. 1, the target setup (viewing angle+position) is associated to the largest score, which can indeed be negative, for example, if there is always an overlap between the regions of interest 205, 206. In such scenarios, the setup with the minimal overlap (corresponding to the largest negative score) will be selected.

After the end-user has placed the camera 200 at this initial position, the camera checks all viewing angles (tilt/pan rotation) to find the optimal viewing angle based on said quantitative score by iteratively and incrementally adjusting the camera's viewing angle, and recording said determined score for each angle. The camera decides which of the viewing angles are good enough which can e.g. be if there is no overlap between the two regions of interest 205, 206 or if the overlap is below threshold (e.g. only a small overlap). If such an optimal viewing angle is detected a stop process is initiated where e.g. the camera blinks a green light. If however none of the viewing angles are good enough, e.g. the scores are −5, −7 and −9, the camera or the computer vision system gives the end-user 201 guidance to re-position the camera (e.g., which direction to move). This is then continued until an optimal viewing angle (the target viewing angle) has been determined.

FIG. 3a-d depicts graphically four different viewing angle positions for the camera 200 shown in FIG. 2 for said two regions of interest, region A 205 and region B 206.

Figure 3A:
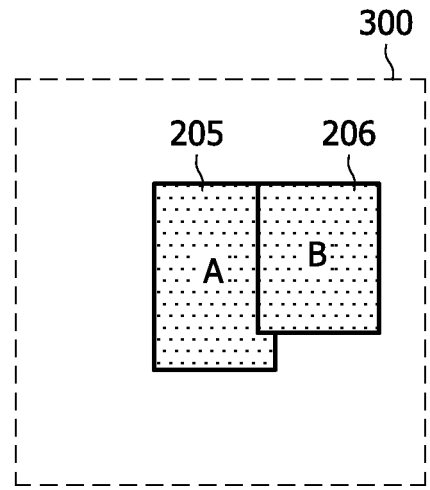
FIG. 3a-d depicts graphically four different viewing angle positions for the camera shown in FIG. 2 for two regions of interest.
Figure 3B:
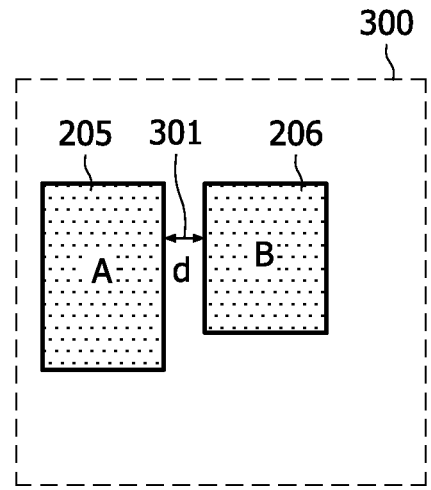
Figure 3C:
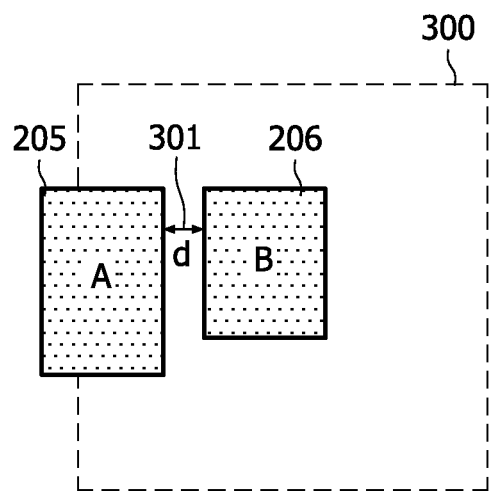
Figure 3D:
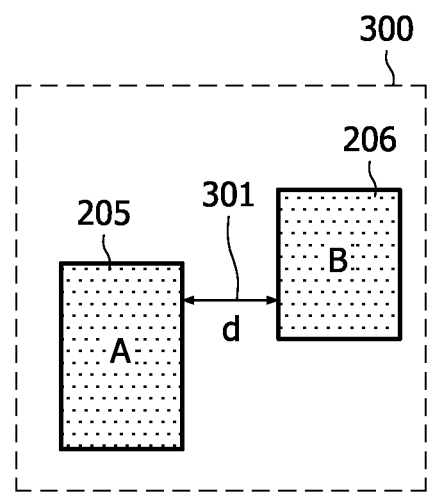

If there is an overlap between region A 205 and region B 206 as shown in FIG. 3a, the score may be given as a negative score (or low positive value), and its value is a function of the ratio of the overlapped region and the smaller occluded interest region. Interest regions that fall outside of the camera view 300 are also treated as overlapped, as shown in FIG. 3c. If there is no overlap amongst the interest regions A and B, as shown in FIGS. 3b and 3d, the score is positive and its value is a function of the minimum distance d 301 between interest regions such that the larger the distance d is the larger becomes the score. For example, the score of FIG. 3d is larger than that of FIG. 3b, indicating the setup of FIG. 3d is preferable to the setup of FIG. 3b. Accordingly, the viewing angle position that is associated to FIG. 3d has the highest quantitative score as becomes the target viewing angle position.

In situations where none of the viewing angle positions are favorable, the camera or the computer system coupled to the camera may indicate possible camera positions which may yield a better view. Assuming a situation as shown in FIG. 1a has the highest score, the overlapping of the interest regions is most likely to be resolved by moving the camera position horizontally and to the left (see from the point of view of the camera). As a result of the above, finding a suitable camera setup will be relatively easy even for a novice user.

Figure 4:
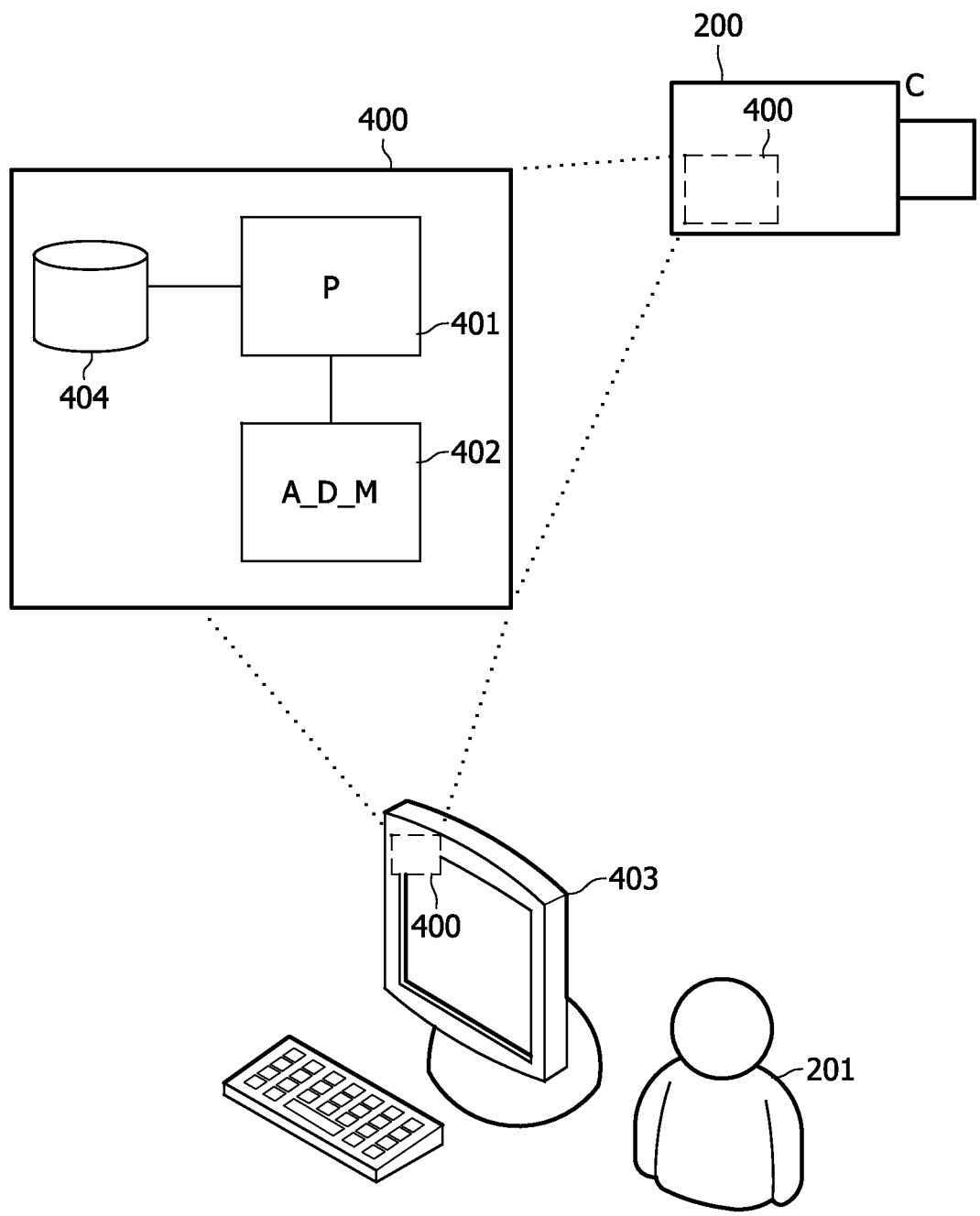
FIG. 4 shows an embodiment of a system according to the present invention for automatically selecting an optimal viewing angle position for a camera.

FIG. 4 shows an embodiment of a system 400 according to the present invention for automatically selecting an optimal viewing angle position for a camera 200, comprising a processor (P) 401, an angle adjusting mechanism (A_D_M) 402 for adjusting the angle position of the camera and a memory 404.

The processor (P) 401 may either be integrated into the camera 200 or be comprised in a computer 403 that is operated by the end-user 201 and determines said quantitative scores as discussed previously in FIGS. 1 and 2, or two processors may be provided, one in the computer and one in the camera. The angle adjusting mechanism (A_D_M) 402 can be any means that adjusts the angle position of the camera iteratively and incrementally by adjusting the camera's viewing angle via tilt and/or pan and/or rotation. In one embodiment, for each angle position the determined scores are recorded and stored in the memory 404. In another embodiment, the largest score at each time point is stored such that when a larger score is recorded it replaces the previous largest score in the memory and the corresponding viewing angle position. In that way, only the largest score and the associated viewing angle position is stored. The memory may either be comprised in the computer 403 or in the camera 200. The adjustments of the viewing angles may be performed manually by the end-user 201, or the camera may be pre-programmed to perform a viewing angle "scan" where e.g. 10 different viewing angles are scanned where for each viewing angle the quantitative score is determined by the processor (P) 401 and stored in the memory 404. Each score is associated to the angle position for which the score was determined. As discussed previously in FIGS. 1 and 2, said target viewing angle position is subsequently determined.

An appropriate software product may be provided that allows the end-user 201 to operate the camera via the end-user home computer, e.g. the end-user 201 can manually operate the camera 200 by e.g. entering how many viewing angles shall be scanned by the camera 200 or by entering which viewing angles should be scanned. The monitor of the computer 403 could e.g. display the different views seen by the camera 200 and display the viewing angles. In that way, the end-user 201 can estimate which viewing angles are likely to be the most optimal viewing angles. Subsequently, the end-user may enter several viewing angles and let the processor determine the scores for each viewing angle.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims; however the inclusion of the reference signs is only for clarity reasons and should not be construed as limiting the scope of the claims.

The invention claimed is:

1. A method of selecting an optimal viewing angle position for a camera, the method comprising acts of:
    determining a first quantitative score for a first viewing angle position of the camera using an overlap amongst pre-selected regions of interest; and
    adjusting the viewing angle position from the first viewing angle position towards at least one second viewing angle position to adjust the overlap;
    determining the quantitative score for each of the at least one second viewing angle position; and
    selecting the optimal viewing angle position based on the determined quantitative scores,
    wherein the greater the overlap between the regions of interest the lower the quantitative scores.

2. The method according to claim 1, wherein the larger the distance between the regions of interest the larger the quantitative score.

3. The method according to claim 2, wherein the viewing angle position associated with the highest quantitative score is selected as the optimal viewing angle position.

4. The method according to claim 1, further comprising acts of:
    defining a threshold quantitative score; and
    when none of the determined quantitative scores are above the threshold quantitative score, issuing a command indicating that the viewing angle position is unfavorable and shall be re-positioned.

5. A non-transitory computer readable medium comprising computer instructions which, when executed by a processor, configure the processor to perform a method of selecting an optimal viewing angle position for a camera, the method comprising acts of:
    determining a quantitative score for a first viewing angle position of the camera using an overlap amongst pre-selected regions of interest; and
    adjusting the viewing angle position from the first viewing angle position towards at least one second viewing angle position to adjust the overlap;
    determining the quantitative score for each of the at least one second viewing angle position; and
    selecting the optimal viewing angle position based on the determined quantitative scores,
    wherein the greater the overlap between the regions of interest the lower the quantitative scores.

6. A system for automatically selecting an optimal viewing angle position for a camera, the system comprising:
    a processor configured to determine a quantitative score for a first viewing angle position of the camera using an overlap amongst pre-selected regions of interest; and
    an angle adjusting mechanism configured to adjust the viewing angle position from the first viewing angle position towards at least one second viewing angle position to adjust the overlap; wherein the processor is further configured: to determine the quantitative score for each of the at least one second viewing angle position, and to select the optimal viewing angle position based on the determined quantitative scores,
    wherein the greater the overlap between the regions of interest the lower the quantitative scores.

* * * * *